United States Patent
Dai et al.

(10) Patent No.: US 10,797,301 B2
(45) Date of Patent: *Oct. 6, 2020

(54) METHOD OF MANUFACTURING AN ELECTROCHEMICAL CELL

(71) Applicant: GM GLOBAL TECHNOLOGY OPERATIONS LLC, Detroit, MI (US)

(72) Inventors: Fang Dai, Troy, MI (US); Shuru Chen, Troy, MI (US); Meinan He, Sterling Heights, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 43 days.

This patent is subject to a terminal disclaimer.

(21) Appl. No.: 16/131,853

(22) Filed: Sep. 14, 2018

(65) Prior Publication Data

US 2019/0207201 A1 Jul. 4, 2019

Related U.S. Application Data

(63) Continuation-in-part of application No. 15/862,187, filed on Jan. 4, 2018.

(51) Int. Cl.

| | |
|---|---|
| H01M 4/1395 | (2010.01) |
| H01M 4/58 | (2010.01) |
| H01M 4/48 | (2010.01) |
| H01M 10/052 | (2010.01) |
| H01M 4/04 | (2006.01) |
| H01M 10/0585 | (2010.01) |
| H01M 10/0525 | (2010.01) |
| H01M 4/38 | (2006.01) |
| H01M 4/66 | (2006.01) |
| H01M 4/02 | (2006.01) |

(52) U.S. Cl.
CPC ....... H01M 4/0452 (2013.01); H01M 4/1395 (2013.01); H01M 4/382 (2013.01); H01M 4/483 (2013.01); H01M 4/5815 (2013.01); H01M 4/667 (2013.01); H01M 10/052 (2013.01); H01M 10/0525 (2013.01); H01M 10/0585 (2013.01); H01M 2004/027 (2013.01)

(58) Field of Classification Search
CPC .. H01M 4/0452; H01M 4/667; H01M 10/052; H01M 4/382; H01M 4/1395; H01M 4/5815; H01M 4/483; H01M 10/0525; H01M 10/0585; H01M 2004/027
See application file for complete search history.

(56) References Cited

U.S. PATENT DOCUMENTS

| | | | |
|---|---|---|---|
| 4,508,608 A * | 4/1985 | Palmer | C23C 14/0623 |
| | | | 204/192.15 |
| 4,539,052 A * | 9/1985 | Palmer | C23C 8/62 |
| | | | 148/240 |
| 2016/0240376 A1* | 8/2016 | Yeh | H01L 21/02568 |
| 2017/0073809 A1* | 3/2017 | Choi | C23C 16/305 |

OTHER PUBLICATIONS

Liu, Y. et al.; Lithium-coated polymeric matrix as a minimum volume-change and dendrite-free lithium metal anode; nature Communications; DOI: 10.1038/ncomms10992; pp. 1-9.

* cited by examiner

*Primary Examiner* — Muhammad S Siddiquee
(74) *Attorney, Agent, or Firm* — Quinn IP Law

(57) ABSTRACT

In a method of manufacturing an electrochemical cell, a porous or non-porous electrically conductive metal substrate may be provided. A conformal metal chalcogenide layer may be formed on a surface of the metal substrate. The metal substrate with the conformal metal chalcogenide layer may be immersed in a nonaqueous liquid electrolyte solution comprising a lithium salt dissolved in a polar aprotic organic solvent. An electrical potential may be established between the metal substrate and a counter electrode immersed in the nonaqueous liquid electrolyte solution such that lithium ions in the electrolyte solution are reduced to metallic lithium and deposited on the surface of the metal substrate over the metal chalcogenide layer to form a conformal lithium metal layer on the surface of the metal substrate over the metal chalcogenide layer.

15 Claims, 1 Drawing Sheet

US 10,797,301 B2

METHOD OF MANUFACTURING AN ELECTROCHEMICAL CELL

CROSS-REFERENCE TO RELATED APPLICATION

This application is a continuation-in-part application of U.S. application Ser. No. 15/862,187 filed Jan. 4, 2018 and incorporated herein by reference in its entirety.

INTRODUCTION

A battery is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles.

Secondary lithium batteries generally comprise one or more electrochemical cells including a negative electrode, a positive electrode, a porous separator, an electrolyte, a negative current collector, and a positive current collector. Such batteries are powered by the cooperative movement of lithium ions and electrons between the negative and positive electrodes of each electrochemical cell. The electrolyte is ionically conductive and provides a medium for the conduction of the lithium ions through the electrochemical cell between the negative and positive electrodes. The current collectors are electrically conductive and allow the electrons to simultaneously travel from one electrode to another via an external circuit. The porous separator physically separates and electrically insulates the electrodes from each other while permitting free ion flow therebetween.

Uniform and sustained physical contact between the negative and positive electrodes and their respective current collectors is necessary to ensure effective charge transport therebetween and efficient battery operation throughout the life of the battery.

SUMMARY

In a method of manufacturing an electrochemical cell, a porous or non-porous electrically conductive metal substrate is provided. A conformal metal chalcogenide layer may be formed on a surface of the metal substrate. The metal substrate with the conformal metal chalcogenide layer may be immersed in a nonaqueous liquid electrolyte solution. The electrolyte solution may comprise a lithium salt dissolved in a polar aprotic organic solvent. Then, an electrical potential may be established between the metal substrate and a counter electrode immersed in the nonaqueous liquid electrolyte solution such that lithium ions in the electrolyte solution are reduced to metallic lithium and deposited on the surface of the metal substrate over the metal chalcogenide layer to form a conformal lithium metal layer on the surface of the metal substrate over the metal chalcogenide layer.

In one form, the metal substrate may be non-porous and may include a first major surface and an opposite second major surface. In such case, the metal chalcogenide layer and the overlying lithium metal layer may be formed on at least one of the first or second major surfaces of the metal substrate.

In another form, the metal substrate may be porous and may include a first side, an opposite second side, and a plurality of pores defined by wall surfaces extending between the first and second sides of the metal substrate. In such case, the metal chalcogenide layer and the overlying lithium metal layer may be formed on the first and second sides of the metal substrate and on the wall surfaces extending between the first and second sides of the metal substrate, without blocking the pores of the metal substrate.

The lithium salt may comprise at least one of $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, $LiN(SO_2F)_2$, $LiBOB$, $LiDFOB$, $LiPF_6$, $LiNO_3$, $Li_2SO_4$, or $LiCl$.

The polar aprotic organic solvent may comprise at least one of a cyclic carbonate, an acyclic carbonate, an aliphatic acyclic ester, an aliphatic carboxylic ester, a γ-lactone, an acyclic ether, or a cyclic ether.

The nonaqueous liquid electrolyte solution may have a lithium salt concentration in the range of 0.1 M to 6 M.

The electrical potential between the metal substrate and the counter electrode may be established by applying an electric current to the counter electrode in the range of one $\mu A/cm^2$ to one $A/cm^2$.

The conformal lithium metal layer may have a thickness in the range of one micrometer to 1000 micrometers.

In one form, the counter electrode may comprise lithium, a host material intercalated with lithium, a lithium alloy, or a combination thereof.

When the electrical potential is established between the metal substrate and the counter electrode, lithium ions from the counter electrode may dissolve in the nonaqueous liquid electrolyte solution.

When the electrical potential is established between the metal substrate and the counter electrode, the lithium ions from the counter electrode may dissolve in the nonaqueous liquid electrolyte solution at a rate equal to that at which metallic lithium is deposited on the surface of the metal substrate over the metal chalcogenide layer.

In one form, the metal chalcogenide layer may comprise a metal oxide, a metal sulfide, a metal selenide, or a combination thereof.

In one form, the metal substrate may comprises copper. In such case, the metal chalcogenide layer may comprise copper oxide, copper sulfide, copper selenide, or a combination thereof.

In one form, the metal chalcogenide layer may comprise a metal oxide. In such case, the metal chalcogenide layer may be formed on the surface of the metal substrate by heating the metal substrate in air such that gaseous oxygen chemically reacts with and bonds to the surface of the metal substrate.

In one form, the metal chalcogenide layer may comprise a metal sulfide or a metal selenide. In such case, the metal chalcogenide layer may be formed on the surface of the metal substrate by enclosing the metal substrate in a chamber, heating a volume of solid phase sulfur or selenium to release a volume of gaseous sulfur or selenium therefrom, and then exposing the surface of the metal substrate to the volume of gaseous sulfur or selenium within the chamber such that the gaseous sulfur or selenium chemically reacts with and bonds to the surface of the metal substrate.

DETAILED DESCRIPTION

The presently disclosed method is directed to the manufacture of an electrochemical cell that includes lithium metal as a negative electrode material and thus exhibits relatively high energy density, as compared to electrochemical cells that include other elements or compounds as negative electrode materials. During manufacture of the electrochemical cell, a robust physical and chemical bond is formed between the lithium metal and a surface of a negative electrode current collector via formation of an intermediate metal chalcogenide layer. The metal chalcogenide layer helps the lithium metal adhere to the surface the negative electrode current collector and allows for the formation of a superior bond between the lithium metal negative electrode layer and the negative electrode current collector, while also improving the coulombic efficiency of the negative electrode layer and without adversely impacting the impedance of the electrochemical cell, as compared to electrochemical cells that include lithium metal negative electrode layers formed directly on their negative electrode current collectors. Formation of the intermediate metal chalcogenide layer also allows for formation of thin uniform lithium metal layers on porous and non-porous negative electrode current collectors having a variety of different configurations.

Figure 1:
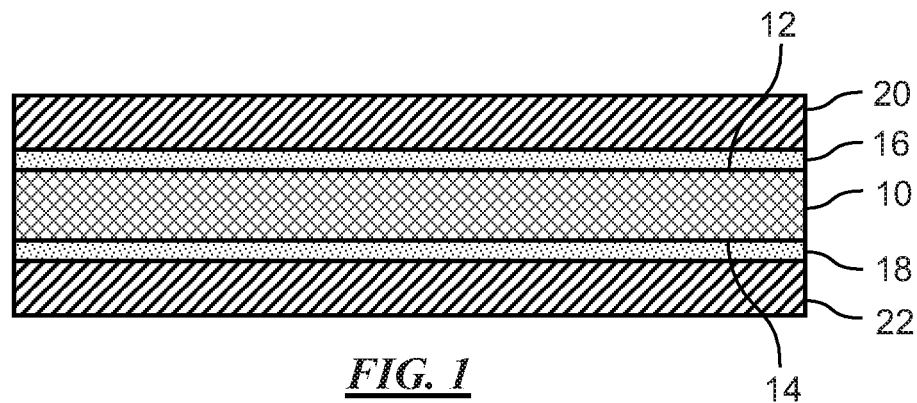
FIG. 1 is a side cross-sectional view of a negative electrode current collector having a first lithium metal negative electrode layer and a first intermediate metal chalcogenide layer formed on a first major surface thereof, and a second lithium metal negative electrode layer and a second metal chalcogenide layer formed on a second major surface thereof

FIG. 1 illustrates in idealized fashion a side cross-sectional view of a negative electrode current collector 10 for an electrochemical cell (not shown) of a secondary lithium metal battery (not shown). The negative electrode current collector 10 includes a first major surface 12 and an opposite second major surface 14. A thin first metal chalcogenide layer 16 is formed directly on the first major surface 12 of the current collector 10, and a thin second metal chalcogenide layer 18 is formed on the second major surface 14 of the current collector 10. In addition, a first lithium metal negative electrode layer 20 is formed directly on the first metal chalcogenide layer 16 over the first major surface 12 of the current collector 10, and a second lithium metal negative electrode layer 22 is formed directly on the second metal chalcogenide layer 18 over the second major surface 14 of the current collector 10.

In assembly, the negative electrode current collector 10 may be electrically coupled to a positive electrode current collector (not shown) which may be coated on one of both sides with a positive electrode layer. A porous separator layer (not shown) may be sandwiched between one of the first or second lithium metal negative electrode layers 20, 22 of the negative electrode current collector 10 and an opposing positive electrode layer of the positive electrode current collector so that lithium ions can flow through the separator layer between the opposing negative and positive electrode layers while electrons simultaneously travel between the negative and positive electrode layers via an external circuit.

The first and second metal chalcogenide layers 16, 18 chemically and physically bond the first and second lithium metal negative electrode layers 20, 22 to the first and second major surfaces 12, 14 of the current collector 10. The metal chalcogenide layers 16, 18 may be "lithiophilic," meaning that lithium has an affinity for the metal chalcogenide layers 16, 18 and actively wets the chalcogenide layers 16, 18. As such, the metal chalcogenide layers 16, 18 may help the lithium metal negative electrode layers 20, 22 adhere to the first and second major surfaces 12, 14 of the current collector 10 and also may help maintain electrical contact between the negative electrode layers 20, 22 and the negative electrode current collector 10 during operation and/or movement of the electrochemical cell. For example, the metal chalcogenide layers 16, 18 may help prevent delamination or separation of the negative electrode layers 20, 22 from the negative electrode current collector 10 during bending or flexing of the electrochemical cell. In addition, the metal chalcogenide layers 16, 18 may promote wetting of the lithium metal negative electrode layers 20, 22 on the first and second major surfaces 12, 14 of the negative electrode current collector 10 during manufacture of the electrochemical cell and during subsequent charging cycles.

The negative electrode current collector 10 may comprise any material that is capable of collecting and reversibly passing free electrons to and from the negative electrode layers 20, 22. For example, the negative electrode current collector 10 may comprise an electrically conductive metal or metal alloy, e.g., a transition metal or alloy thereof. In some specific examples, the negative electrode current collector 10 may comprise copper (Cu), nickel (Ni), an iron (Fe) alloy (e.g., stainless steel), or titanium (Ti). Other electrically conductive metals may of course be used, if desired.

The negative electrode current collector 10 may be in the form of a thin and flexible porous or non-porous metal substrate. For example, the negative electrode current collector 10 may be in the form of a thin and flexible non-porous metal foil, a porous metal mesh, a perforated metal sheet, or a porous open cell metal foam. The specific configuration of the negative electrode current collector 10 may depend upon the intended application of use. The negative electrode current collector 10 may have a thickness in the range of 8 micrometers to 150 micrometers. For example, in embodiments where the negative electrode current collector 10 is in the form of a non-porous metal foil, a porous metal mesh, or a perforated metal sheet, the current collector 10 may have thicknesses in the range of 8 micrometers to 20 micrometers. As another example, in embodiments where the negative electrode current collector 10 is in the form of porous open-cell metal foams, the current collector 10 may have thicknesses in the range of 50 micrometers to 150 micrometers.

In FIG. 1, the first and second major surfaces 12, 14 of the current collector 10 are depicted as being substantially flat, which may be the case in embodiments where the current collector 10 comprises a metal foil or a perforated metal sheet. However, in other embodiments, for example, where the current collector 10 comprises a metal mesh or an open-cell metal foam, the surfaces 12, 14 of the current collector 10 may be contoured and the layers 16, 18, 20, 22 may substantially conform to the contours thereof. For example, in some embodiments, the current collector 10 may comprise an open-cell metal foam (not shown) having a plurality of open interconnected pores defined by wall surfaces that extend between a first side and an opposite second side of the current collector 10. In such case, a metal chalcogenide layer and an overlying lithium metal negative electrode layer may be formed on the current collector 10 and on the wall surfaces extending between the first and second sides of the current collector 10.

The first and second metal chalcogenide layers 16, 18 each may comprise a transition metal chalcogenide (e.g., an oxide, sulfide, and/or selenide of copper (Cu), nickel (Ni), iron (Fe), and/or titanium (Ti)). For example, one or both of the metal chalcogenide layers 16, 18 may comprise a transition metal chalcogenide represented by one or more of the following formulas: $Me_2Ch$, $MeCh_2$, $MeCh$, or $Me_2Ch_3$, where Me is a transition metal (e.g., Cu, Ni, Fe, and/or Ti) and Ch is a chalcogen (e.g., O, S, and/or Se). The composition of the metal chalcogenide layers 16, 18 may depend on the composition of the negative electrode current collector 10. For example, in embodiments where the negative electrode current collector 10 comprises copper (Cu), the metal chalcogenide layers 16, 18 may comprise copper oxide (e.g., CuO and/or $Cu_2O$), copper sulfide (e.g., CuS and/or $Cu_2S$), and/or copper selenide (e.g., CuSe and/or $Cu_2Se$). Additionally or alternatively, the metal chalcogenide layers 16, 18 may comprise a lithium chalcogenide (e.g., an oxide, sulfide, and/or selenide of lithium). For example, the metal chalcogenide layers 16, 18 may comprise a lithium (Li) chalcogenide having the formula $Li_2Ch$, where Ch is a chalcogen (e.g., O, S, and/or Se). In some embodiments, the metal chalcogenide layers 16, 18 may comprise a composite of one or more transition metal chalcogenides and one or more lithium chalcogenides. The chalcogenides included in the metal chalcogenide layers 16, 18 may be stoichiometric or non-stoichiometric. The metal chalcogenide layers 16, 18 may have thicknesses in the range of one nanometer to 10 micrometers.

The lithium metal negative electrode layers 20, 22 may consist essentially of lithium (Li) metal. For example, the lithium metal negative electrode layers 20, 22 may comprise, by weight, greater than 97% lithium or, more preferably, greater than 99% lithium. However, the negative electrode layers 20, 22 preferably do not comprise any other elements or compounds that undergo a reversible redox reaction with lithium during operation of the electrochemical cell. For example, the negative electrode layers 20, 22 preferably do not comprise an intercalation host material that is formulated to undergo the reversible insertion or intercalation of lithium ions or an alloying material that can electrochemically alloy and form compound phases with lithium. In addition, the negative electrode layers 20, 22 preferably do not comprise a conversion material or an alloy material that can electrochemically alloy and form compound phases with lithium. Some examples of materials that are preferably excluded from the negative electrode layers 20, 22 of the present disclosure include carbon-based materials (e.g., graphite, activated carbon, carbon black, and graphene), silicon and silicon-based materials, tin oxide, aluminum, indium, zinc, cadmium, lead, germanium, tin, antimony, titanium oxide, lithium titanium oxide, lithium titanate, lithium oxide, metal oxides (e.g., iron oxide, cobalt oxide, manganese oxide, copper oxide, nickel oxide, chromium oxide, ruthenium oxide, and/or molybedenum oxide), metal phosphides, metal sulfides, and metal nitrides (e.g., phosphides, sulfides, and/or nitrides or iron, manganese, nickel, copper, and/or cobalt). In addition, the negative electrode layer 12 preferably does not comprise a polymeric binder. Some examples of polymeric binders that are preferably excluded from the negative electrode layer 12 of the present disclosure include polyvinylidene fluoride (PVdF), ethylene propylene diene monomer (EPDM) rubber, styrene butadiene rubber (SBR), carboxymethyl cellulose (CMC), and polyacrylic acid. The lithium metal negative electrode layers 20, 22 may have thicknesses in the range of one micrometer to 1000 micrometers.

The first and second metal chalcogenide layers 16, 18 may be respectively formed on the first and second major surfaces 12, 14 of the current collector 10 by any suitable means. For example, the first and second metal chalcogenide layers 16, 18 may be coated, deposited or otherwise formed on the first and second major surfaces 12, 14 of the current collector 10 by exposing the surfaces 12, 14 to a chalcogen in gas phase. Exposing the surfaces 12, 14 of the current collector 10 to a gaseous chalcogen allows the chalcogen to chemically react with the surfaces 12, 14 of the current collector 10 and effectively form the first and second metal chalcogenide layers 16, 18 on the surfaces 12, 14 such that the layers 16, 18 uniformly and effectively conform to the contours of the surfaces 12, 14, regardless of their configuration. In addition, in embodiments where the current collector 10 is porous, exposing the current collector 10 to a gaseous chalcogen allows the chalcogen to chemically react with the major surfaces 12, 14 of the current collector 10 (as well as any wall surfaces extending between the surfaces 12, 14) and effectively and uniformly form the first and second metal chalcogenide layers 16, 18 thereon, without physically clogging or blocking the pores of the current collector 10.

Figure 2:
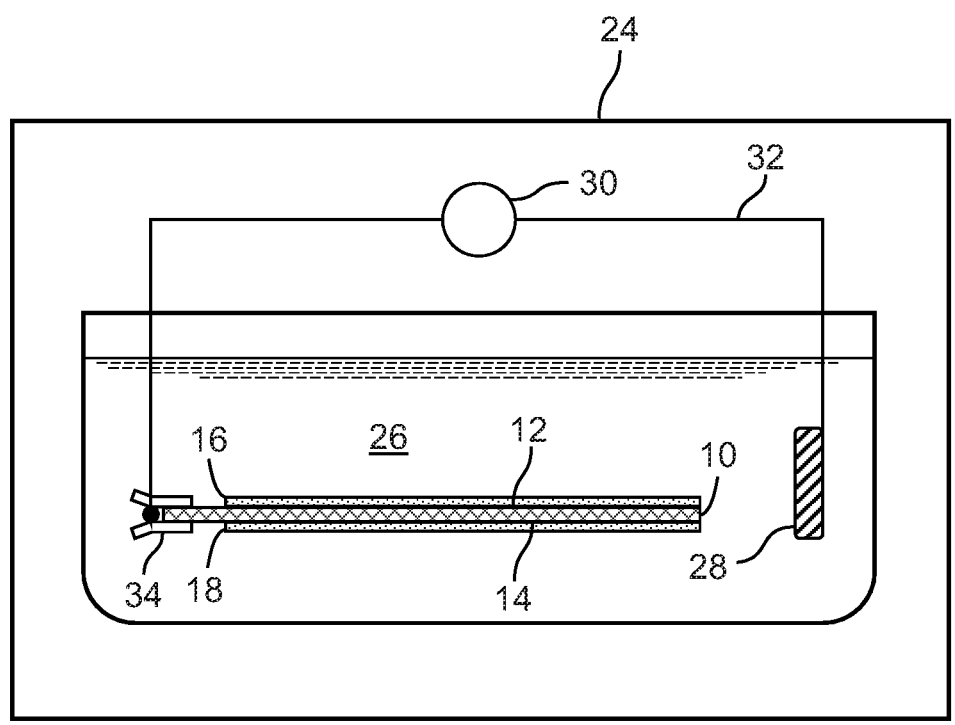
FIG. 2 is a cross-sectional view of an embodiment of an apparatus for forming a lithium metal layer over a metal chalcogenide layer on a surface of a negative electrode current collector via an electrochemical deposition process.

Referring now to FIG. 2, after formation of the first and second metal chalcogenide layers 16, 18 on the first and second major surfaces 12, 14 of the negative electrode current collector 10, the first and second lithium metal negative electrode layers 20, 22 may be respectively formed on the first and second metal chalcogenide layers 16, 18 over the first and second major surfaces 12, 14 of the current collector 10 using an electrochemical deposition process (also referred to as electroplating). In such case, the current collector 10 (including the first and second metal chalcogenide layers 16, 18) may be placed in an enclosed chamber 24 and at least partially immersed in a nonaqueous liquid electrolyte solution 26 along with a counter electrode 28. In one form, the current collector 10 may be held within the electrolyte solution 26 by a clamp 34.

The nonaqueous liquid electrolyte solution 26 is ionically conductive and may comprise a lithium salt dissolved in a polar aprotic organic solvent. The lithium salt may comprise $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiN(SO_2F)_2$, LiBOB, LiDFOB, $LiPF_6$, $LiNO_3$, $Li_2SO_4$, LiCl, and combinations thereof. The organic solvent may comprise a cyclic carbonate (i.e., ethylene carbonate, propylene carbonate), an acyclic carbonate (i.e., dimethyl carbonate, diethyl carbonate, ethyl methyl carbonate), an aliphatic acyclic ester, an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane, tetraethylene glycol dimethyl ether, poly(ethylene glycol) dimethyl ether), a cyclic ether (i.e., tetrahydrofuran, 2-methyltetrahydrofuran), or a combination thereof. The nonaqueous liquid electrolyte solution 26 may have a lithium salt concentration in the range of 0.1 M to 6 M.

The counter electrode 28 is sacrificial and may comprise any lithium-containing material that can electrochemically release lithium ions when an electrical potential is established between the current collector 10 and the counter electrode 28. For example, in one form, the counter electrode 28 may consist essentially of lithium (Li) metal, e.g., the counter electrode 28 may comprise, by weight, greater than 97% lithium or, more preferably, greater than 99% lithium. In other embodiments, the counter electrode 28 may be a host material with intercalated lithium ions or a lithium alloy. Examples of host materials that can be intercalated or alloyed with lithium include: carbon-based materials (e.g., graphite, activated carbon, carbon black, and graphene), silicon, silicon-based alloys, tin oxide, aluminum, indium, zinc, germanium, silicon oxide, titanium oxide, lithium titanate, transition metal oxides represented by the formula LiMeO$_2$, LiMePO$_4$, and/or LiMe$_2$O$_4$, where Me is a transition metal, and combinations thereof.

The current collector 10 and the counter electrode 28 are electrically coupled to each other and to a power supply 30 via an external circuit 32. To begin the electrochemical deposition process, an electrical potential is established between the current collector 10 and the counter electrode 28, for example, by applying an electric current from the power supply 30 to the counter electrode 28. Establishing an electrical potential between the current collector 10 and the counter electrode 28 initiates chemical oxidation and reduction reactions at the current collector 10 and the counter electrode 28. As a result, lithium metal ions dissolved in the electrolyte solution 26 are reduced at the interface between the electrolyte solution 26 and the current collector 10 such that metallic lithium is deposited onto the first and second metal chalcogenide layers 16, 18 over the first and second major surfaces 12, 14 of the current collector 10. In addition, when an electrical potential is established between the current collector 10 and the counter electrode 28, lithium from the counter electrode 28 is oxidized and dissolves in the electrolyte solution 26, with the rate at which lithium from the counter electrode 28 dissolves in the electrolyte solution 26 being equal to the rate at which metallic lithium is deposited on the first and second metal chalcogenide layers 16, 18.

The electric current applied to the counter electrode 28 during the electrochemical deposition process may be in the range of one μA/cm$^2$ to one A/cm$^2$. The electrical potential established between the current collector 10 and the counter electrode 28 during the electrochemical deposition process may be in the range of 1 V to 6 V and may depend upon the composition of the current collector 10, the counter electrode 28, and the electrolyte solution 26. The duration of the deposition process may depend upon the desired thickness of the lithium metal negative electrode layers 20, 22 and the electric current applied to the counter electrode 28 during the electrochemical deposition process. In one form, the electric current applied to the counter electrode 28 during the electrochemical deposition process may be about one mA/cm$^2$ and the deposition process may be performed for a duration of about 4 hours to form lithium metal negative electrode layers 20, 22 having thicknesses of about 20 μm.

In some embodiments, it may be desirable to form the first and/or second lithium metal negative electrode layers 20, 22 on a portion of the first and/or second major surfaces 12, 14 of the current collector 10, instead of forming the first and second lithium metal negative electrode layers 20, 22 over the entire first and second major surfaces 12, 14 of the current collector 10. In such case, the first and/or second metal chalcogenide layers 16, 18 may be selectively formed over the portion(s) of the negative electrode current collector 10 that are to be coated with the lithium metal negative electrode layers 20, 22. In some instances, a mask may be used to cover select surfaces of the current collector 10 to prevent formation of the metal chalcogenide layer(s) 16, 18 on those select surfaces. Thereafter, the electrochemical deposition process may be performed such that the lithium metal negative electrode layer(s) 20, 22 are formed over the metal chalcogenide layer(s) 16, 18, without forming the lithium metal layer(s) 20, 22 on a remaining surface portion of the current collector 10.

In some embodiments, it may be desirable to sequentially form one or more metal chalcogenide layers and lithium metal negative electrode layers on one or more surfaces of an electrically conductive metal substrate (not shown), and then to form the metal substrate into the desired size and shape of one or more negative electrode current collectors. In such case, the metal substrate may comprise the same material and may exhibit the same physical structure (e.g., non-porous metal foil, porous metal mesh, perforated metal sheet, or porous open-cell metal foam) as that of negative electrode current collectors to be formed.

The above description of preferred exemplary embodiments, aspects, and specific examples are merely descriptive in nature; they are not intended to limit the scope of the claims that follow. Each of the terms used in the appended claims should be given its ordinary and customary meaning unless specifically and unambiguously stated otherwise in the specification.

What is claimed is:

1. A method of manufacturing an electrochemical cell, the method comprising:
   providing a porous or non-porous electrically conductive metal substrate;
   forming a conformal metal chalcogenide layer on a surface of the metal substrate;
   immersing the metal substrate with the conformal metal chalcogenide layer in a nonaqueous liquid electrolyte solution comprising a lithium salt dissolved in a polar aprotic organic solvent; and
   establishing an electrical potential between the metal substrate and a counter electrode immersed in the nonaqueous liquid electrolyte solution such that lithium ions in the electrolyte solution are reduced to metallic lithium and deposited on the surface of the metal substrate over the metal chalcogenide layer to form a conformal lithium metal layer on the surface of the metal substrate over the metal chalcogenide layer.

2. The method of claim 1 wherein the metal substrate is non-porous and includes a first major surface and an opposite second major surface, and wherein the metal chalcogenide layer and the overlying lithium metal layer are formed on at least one of the first or second major surfaces of the metal substrate.

3. The method of claim 1 wherein the metal substrate is porous and includes a first side, an opposite second side, and a plurality of pores defined by wall surfaces extending between the first and second sides of the metal substrate, and wherein the metal chalcogenide layer and the overlying lithium metal layer are formed on the first and second sides of the metal substrate and on the wall surfaces extending between the first and second sides of the metal substrate, without blocking the pores of the metal substrate.

4. The method of claim 1 wherein the lithium salt comprises at least one of LiClO$_4$, LiAlCl$_4$, LiI, LiBr, LiSCN, LiBF$_4$, LiB(C$_6$H$_5$)$_4$, LiAsF$_6$, LiCF$_3$SO$_3$, LiN(CF$_3$SO$_2$)$_2$, LiN(SO$_2$F)$_2$, LiBOB, LiDFOB, LiPF$_6$, LiNO$_3$, Li$_2$SO$_4$, or LiCl.

5. The method of claim 1 wherein the polar aprotic organic solvent comprises at least one of a cyclic carbonate, an acyclic carbonate, an aliphatic acyclic ester, an aliphatic carboxylic ester, a γ-lactone, an acyclic ether, or a cyclic ether.

6. The method of claim 1 wherein the nonaqueous liquid electrolyte solution has a lithium salt concentration in the range of 0.1 M to 6 M.

7. The method of claim 1 wherein the electrical potential between the metal substrate and the counter electrode is established by applying an electric current to the counter electrode in the range of one μA/cm$^2$ to one A/cm$^2$.

8. The method of claim 1 wherein the conformal lithium metal layer has a thickness in the range of one micrometer to 1000 micrometers.

9. The method of claim 1 wherein the counter electrode comprises lithium, a host material intercalated with lithium, a lithium alloy, or a combination thereof.

10. The method of claim 1 wherein, when the electrical potential is established between the metal substrate and the counter electrode, lithium ions from the counter electrode dissolve in the nonaqueous liquid electrolyte solution.

11. The method of claim 10 wherein, when the electrical potential is established between the metal substrate and the counter electrode, the lithium ions from the counter electrode dissolve in the nonaqueous liquid electrolyte solution at a rate equal to that at which metallic lithium is deposited on the surface of the metal substrate over the metal chalcogenide layer.

12. The method of claim 1 wherein the metal chalcogenide layer comprises a metal oxide, a metal sulfide, a metal selenide, or a combination thereof.

13. The method of claim 1 wherein the metal substrate comprises copper, and wherein the metal chalcogenide layer comprises copper oxide, copper sulfide, copper selenide, or a combination thereof.

14. The method of claim 1 wherein the metal chalcogenide layer comprises a metal oxide, and wherein the metal chalcogenide layer is formed on the surface of the metal substrate by heating the metal substrate in air such that gaseous oxygen chemically reacts with and bonds to the surface of the metal substrate.

15. The method of claim 1 wherein the metal chalcogenide layer comprises a metal sulfide or a metal selenide, and wherein the metal chalcogenide layer is formed on the surface of the metal substrate by enclosing the metal substrate in a chamber, heating a volume of solid phase sulfur or selenium to release a volume of gaseous sulfur or selenium therefrom, and then exposing the surface of the metal substrate to the volume of gaseous sulfur or selenium within the chamber such that the gaseous sulfur or selenium chemically reacts with and bonds to the surface of the metal substrate.

* * * * *